Aug. 21, 1923.
A. H. JONES
1,465,788
MULTIPLE ROLLER BEARING
Filed Oct. 31, 1921
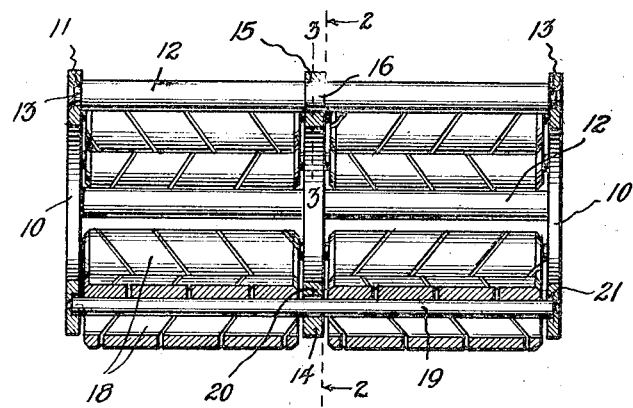
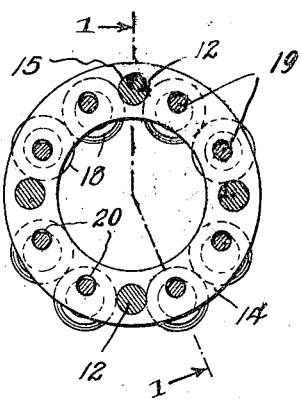
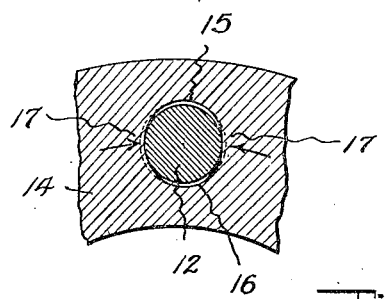
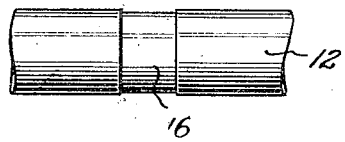
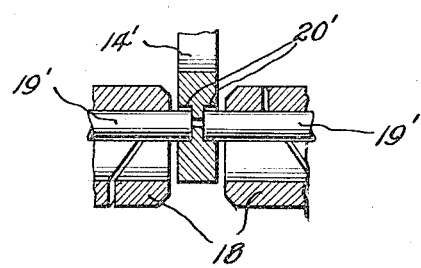
INVENTOR
Allan H. Jones
BY Geo. H. Beeler
ATTORNEY Patented Aug. 21, 1923.

1,465,788

UNITED STATES PATENT OFFICE.

ALLAN H. JONES, OF BELLEVILLE, NEW JERSEY, ASSIGNOR TO CIRCLE STAMPING & MFG. CO., OF BELLEVILLE, NEW JERSEY, A CORPORATION OF NEW JERSEY.

MULTIPLE-ROLLER BEARING.

Application filed October 31, 1921. Serial No. 511,565.

*To all whom it may concern:*

Be it known that I, ALLAN H. JONES, a citizen of the United States, residing at Belleville, in the county of Essex and State of New Jersey, have invented certain new and useful Improvements in Multiple-Roller Bearings, of which the following is a specification.

This invention relates to roller bearings, and has particular reference to anti-friction bearings of the cylinder type in which the rollers, whether cylindrical or tapered, are made of spirally wound or shaped strip metal, but while obviously I am not particularly concerned with either the shape or manner of construction of the rollers, the invention has particular reference to the manner of assembling the rollers into a unit bearing comprising a cage and a plurality of series of rollers carried permanently thereby.

Among the objects of the invention is to provide a roller bearing unit comprising a cage of sufficient length to accommodate a plurality of series of rollers, the cage being so constructed as to render it practically impossible for the same to be distorted as a result of twisting or tortional strains, a condition which results so frequently in long bearings as ordinarily made, due to binding or cramping of one end of the cage while a tortional moment is exerted upon the other end of the cage.

Having in view, therefore, the fact that since the roller bearing cages ordinarily comprise a pair of end rings, tied or connected to each other by means of tie bars arranged perpendicularly between them and because there can be no diagonal means arranged between said rings to brace them, it follows that with the beginning of the least amount of looseness in the joints between the rings and the bars, the detrimental torsion or twisting action above referred to soon causes the collapse of the entire bearing. In my construction however I provide a means to so effectually brace or tie the end rings as to render it practically impossible for either of them to creep or move in advance of the other around the axis of the bearing and thereby I materially increase the length of life and utility of the bearing as an efficient mechanical construction.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a longitudinal section of one form of my invention, on the line 1—1 of Fig. 2.

Fig. 2 is a vertical transverse section on the line 2—2 of Fig. 1.

Fig. 3 is an enlarged sectional detail on the line 3—3 of Fig. 1.

Fig. 4 is a detail view in side elevation of the central portion of a tie bar.

Fig. 5 is a longitudinal vertical section of the central lower portion of a multiple bearing indicating a slight modification.

Referring now more specifically to the first set of figures I show my improved bearing as comprising a pair of spaced end rings 10 each of which is provided with a circular series of holes 11 therethrough, shown as four in number and equally spaced circumferentially. These holes are provided for the attachment of a series of tie bars 12 each having reduced ends 13 projected into and preferably secured in the holes 11. The description thus far in connection with the drawings is conventional, but in the further description it will be observed that there is provided a bearing of relative long type and one which is subject under the usual conditions to a tendency to twist, because the tie bars are so long in proportion to the diameter of the rings. As a part of the means to prevent this objection I provide a central binder ring 14 shown as arranged midway between the end rings and of any suitable thickness compared therewith. This binder ring is provided with as many holes 15 as there are tie bars and spaced from one another circumferentially the same as the holes 11. These holes 15 are formed of the same diameter as the tie bars so that in assemblage of the bearing either end portion of the tie bars may be slipped through said holes. The central portion of each tie bar is reduced slightly but materially in the form of a shallow groove 16 of a width substantially equal to the width or thickness of the binder ring, the grooves of all of the tie bars being brought directly within the confines of the ring. After the tie bars are introduced into the binder ring as just described they are all locked in the position indicated by any suitable means such for example as a process of staking, whereby the body of the ring 14 on opposite sides of the reduced portion of each tie bar is forced snugly into the groove 16 as shown in Fig. 3 at 17 and whereby the tie bars are effectually braced so as to withstand the twisting or tortional action above referred to. This staking is preferably done in a circumferential direction of the bearing as distinguished from a radial direction, and hence the inner and outer edge portions of the ring 14 are not disturbed but left perfectly circular. As shown in Fig. 3 this staking may be described as being done in a direction tangential to the surface of a geometric cylinder coinciding with the axes of the bars 12.

Between each two adjacent tie bars in the system and parallel thereto are arranged one or more rollers 18, shown as of the spiral flexible type and arranged in pairs, rights and lefts, and with a circumferential series of rollers on each side of the binder ring. These rollers are of a diameter, as usual, greater than the width radially of the metal of the rings, for the obvious purpose of providing bearing contact with the axle and the bearing sleeve without contact of the rings therewith, and as heretofore these rollers are loosely mounted upon supporting rods. One of the peculiarities of my improvement however is to provide supporting rods 19 so arranged as to increase the stiffness of the cage and yet without disturbing the required looseness of the individual rollers with respect to the cage as a whole. The rods 19 extend from one ring to the other through holes 20 formed in the binder ring 14. The ends of each rod 19 are formed perfectly flat and perpendicular to the axis of the rod, and said ends are fitted squarely against the bottoms of pits 21 formed at the inner sides of the end rings. While the holes 20 and pits 21 may be somewhat larger in diameter than the rods, yet by making the rods with perfectly perpendicular ends fitted against the bottom of the pits there is a tremendous amount of force provided in the rods tending to resist the torsional or twisting action of the cage taken in connection with the fact that the tie bars are so connected to the end rings as to hold them from spreading. Thus each rod 19 supports two rollers 18 and cooperates with the tie bar construction to prevent twisting of the cage.

In the modification of Fig. 5 the binder ring 14' is provided with a pair of pits 20' instead of a single hole 20, and these pits are preferably in axial alignment. Instead of a single rod 19 for the support of aligned rollers I provide two rods 19' whose outer or remote ends will be understood as being supported in pits 21 as shown in Fig. 1, but whose inner or adjacent ends are fitted securely against the bottoms of the pits 20'. Otherwise the construction and assemblage of the modified construction are the same as detailed above. With the rods 19 or 19' cut of uniform length and with ends perpendicular to their axis and assembled as above described, it will be appreciated that they will possess a considerable degree of force tending to resist twisting of the cage, because to twist the cage would compel the rods to assume an oblique position with respect to their normal parallelism with the axis of the bearing, and this obliquity would tend to compel the rods to assume a position in which their diagonal dimensions would be brought into action. But since the rings 10 are initially tied at a fixed distance apart and in practice there is practically no wear on the ends of the rods tending to shorten them, this diagonal position of the rods cannot take place.

I claim:

1. In a multiple roller bearing, the combination of a cage comprising a pair of end rings, a binder ring between the end rings and having a series of holes therethrough, tie bars slipped endwise through the binder ring holes, said bars having annular grooves of a width equal to the thickness of the body of the binder ring and into which grooves portions of the binder ring are forced in a direction serving to prevent twisting of the cage, the ends of the tie bars being rigidly connected to the end rings for holding them at a predetermined distance apart, and a plurality of series of rollers located between the respective end rings and the binder rings.

2. A roller bearing cage comprising end rings, a series of parallel tie bars rigidly connected to the rings, each tie bar being provided with a shallow cylindrical groove between the rings, and binder means connected to the grooved portions of the tie bars serving to stiffen the cage and prevent twisting thereof.

3. A cage as set forth in claim 2 in which the grooved portions of the tie bars are all in the same plane parallel to the end rings and the binder means is a ring having a width equal to the width of the grooves.

4. A cage as set forth in claim 2 in which the grooved portions of the tie bars are all in the same plane and the binder means is a ring coinciding with the grooved portions and the body of said ring is forced circumferentially of the cage and in a direction substantially tangential to an imaginary cylinder coinciding with the axes of the tie bars into interlocking co-operation with said grooves.

5. A roller bearing as set forth in claim 1 in which the end rings are provided with flat bottom pits and there are provided roller supporting rods having squared ends fitted against said bottoms, the pits being enough larger than the rod ends to provide for free movement of the squared ends over the flat bottoms of the pits.

6. A roller bearing as set forth in claim 1 in which the end rings are provided with flat bottom pits on their inner surfaces and there are provided roller supporting rods fitted with their ends flatly against the bottoms of said pits and supported between the end rings loosely in said binder ring.

In testimony whereof I affix my signature.

ALLAN H. JONES.